US007633613B2

(12) United States Patent
Knittel

(10) Patent No.: US 7,633,613 B2
(45) Date of Patent: Dec. 15, 2009

(54) METHOD FOR DETERMINING SPHERICAL ABERRATION

(75) Inventor: Joachim Knittel, Tuttlingen (DE)

(73) Assignee: Thomson Licensing, Boulogne Billancourt (FR)

( * ) Notice: Subject to any disclaimer, the term of this patent is extended or adjusted under 35 U.S.C. 154(b) by 696 days.

(21) Appl. No.: 10/585,536

(22) PCT Filed: Nov. 6, 2004

(86) PCT No.: PCT/EP2004/012593

§ 371 (c)(1),
(2), (4) Date: Jul. 10, 2006

(87) PCT Pub. No.: WO2005/069280

PCT Pub. Date: Jul. 28, 2005

(65) Prior Publication Data

US 2009/0185180 A1    Jul. 23, 2009

(30) Foreign Application Priority Data

Jan. 8, 2004  (EP) ................................ 04000258

(51) Int. Cl.
*G01N 21/00* (2006.01)
(52) U.S. Cl. .................................. 356/239.2
(58) Field of Classification Search .............. 356/239.2, 356/124; 369/112.02
See application file for complete search history.

(56) References Cited

U.S. PATENT DOCUMENTS 5,708,638 A * 1/1998 Braat et al. .............. 369/44.29

| 6,353,582 | B1 | 3/2002 | Kikuchi |
| 7,272,083 | B2 * | 9/2007 | Takeshita ................. 369/44.23 |
| 2002/0057359 | A1 | 5/2002 | Tadano et al. |
| 2002/0176332 | A1 | 11/2002 | Saimi et al. |
| 2003/0053393 | A1 | 3/2003 | Shimano et al. |
| 2003/0075669 | A1 | 4/2003 | Tadaki |

FOREIGN PATENT DOCUMENTS

EP    1209669    5/2002

OTHER PUBLICATIONS

Search Report Dated Aug. 8, 2005.

* cited by examiner

*Primary Examiner*—Roy Punnoose
(74) *Attorney, Agent, or Firm*—Robert D. Shedd; Harvey D. Fried; Patricia Verlangieri

(57) ABSTRACT

The present invention relates to a method and a device for determining spherical aberration occurring during reading from and/or writing to optical recording media.

According to the invention, a method for determining spherical aberration includes the steps of:
  splitting the light beam into at least two partial light beams with a volume hologram having stored wavefront patterns with various degrees of spherical aberration;
  focusing the partial light beams onto respective detectors, whereby at least one signal generated by the detectors depends on the positions of the respective partial light beam; and
  determining the spherical aberration using the signals generated by the detectors.

4 Claims, 3 Drawing Sheets

METHOD FOR DETERMINING SPHERICAL ABERRATION

This application claims the benefit, under 35 U.S.C. § 365 of International Application PCT/EP04/012593, filed Nov. 6, 2004, which was published in accordance with PCT Article 21(2) on Jul. 28, 2005 in English and which claims the benefit of European patent application No. 04000258.6, filed Jan. 8, 2004.

FIELD OF THE INVENTION

The present invention relates to a method and a device for determining spherical aberration occurring during reading from and/or writing to optical recording media, and to an apparatus for reading from and/or writing to optical recording media using such method or device.

BACKGROUND OF THE INVENTION

Spherical aberration occurs in optical pickups during reading from and/or writing to optical recording media, when the thickness of the cover-layer of the recording medium is not optimal for the objective lens of the optical pickup. In general objective lenses are only well corrected for a single cover-layer thickness. However, variations of the thickness of the cover-layer occur due to the manufacturing process of the recording medium, and, which is more important, in multi-layer optical recording media systems.

Currently proposed methods for correcting the spherical aberration are telescopes or liquid crystal elements. For correctly setting these elements a control signal has to be provided by the optical pickup, which gives information about the current amount of spherical aberration. For generating such a control signal the amount of spherical aberration has to be detected.

US patent application US 2002/0057359 discloses an aberration detection device which detects spherical aberration by separating a light beam appropriately such as to enlarge a difference in the positions of minimum spot diameter of the separated light beams. The light beams are separated by a hologram having two regions divided by a boundary corresponding to an extreme value of a curve representing a wave front when the light beam has a minimum beam diameter. The separated beams are focused onto two detection devices. One detection device is located closer to the hologram than the focus position of a first-order diffracted light of the hologram, while the second detection device is located farther from the hologram. By measuring the spot size of the separated beams the spherical aberration is detected.

US 2002/0176332 discloses an aberration detection device for an optical disk player. A returning light beam emitted by a light source and reflected by an optical disk is separated by a half mirror, and partitioned and deflected at a hologram into a light beam passing a first region and a light beam passing a second region. The light beam passing the first region is received by a plurality of photo-detectors, and the aberration is detected by comparing the resulting signals.

SUMMARY OF THE INVENTION

It is an object of the invention to propose an alternative solution for determining spherical aberration in a light beam.

According to the invention, this object is achieved by a method including the steps of:

splitting the light beam into at least two partial light beams with a volume hologram having stored wavefront patterns with various degrees of spherical aberration;

focusing the partial light beams onto respective detectors, whereby at least one signal generated by the detectors depends on the positions of the respective partial light beam; and determining the spherical aberration using the signals generated by the detectors.

According to the invention the wavefront of the incoming light beam is compared with the plurality of stored wavefronts. The splitting of the light beam into a plurality of partial light beams then depends on the grade of similarity of the wavefront of the incoming light beam with one of more of the stored wavefronts. The splitting of the light beam into partial light beams is performed such that the position of at least one of the partial light beams depends on the amount of spherical aberration of the light beam. Therefore, by determining the position of this partial light beam, the spherical aberration is measured. Preferably, only a small part of the light beam is directed onto the detectors for measuring the spherical aberration, while the main part is used for focusing and tracking and for reading the data from the optical recording medium.

According to another aspect of the invention, the object of the invention is also achieved by a device for determining spherical aberration in a light beam, including:

a volume hologram having stored wavefront patterns with various degrees of spherical aberration for splitting the light beam into at least two partial light beams;

focusing means for focusing the partial light beams onto respective detectors; and a signal processor for determining the spherical aberration using the signals generated by the detectors.

Favourably, the partial beams are focused onto the respective detectors in dependence on the amount of spherical aberration in the light beam. For example, if the wavefront has a positive spherical aberration, a part of the light beam is directed onto a first detector. If the wavefront has no spherical aberration, a part of the light beam is directed onto a second detector. If, however, the wavefront has a negative spherical aberration, a part of the light beam is directed onto a third detector. In practice more than one detector receives a partial light beam from the hologram. The amount of spherical aberration is then determined from the amount of energy in each partial light beam.

According to yet another aspect of the invention, the object of the invention is achieved by a device for determining spherical aberration in a light beam, including:

a hologram for splitting the light beam into at least two partial light beams;

focusing means for focusing the partial light beams onto respective detectors; and a signal processor for determining the spherical aberration using the signals generated by the detectors.

Favourably, an apparatus for reading from and/or writing to optical recording media uses a method or comprises a device according to the invention for determining spherical aberration in a light beam.

BRIEF DESCRIPTION OF THE DRAWINGS

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

DETAILED DESCRIPTION OF THE INVENTION

Figure 1:
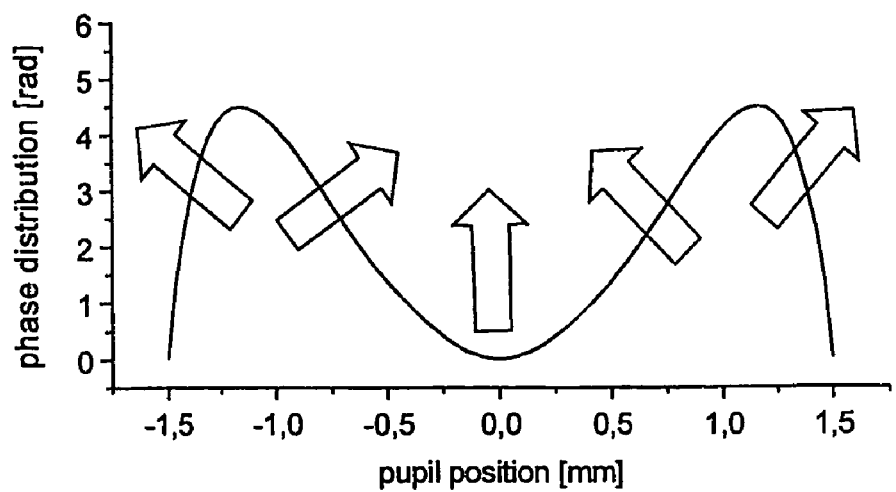
FIG. 1 shows the phase distribution of the returning light beam when spherical aberration is present.

For reading from an optical recording medium generally a light beam is focused on a data layer of the recording medium. The light beam reflected from the recording medium is then modulated by the data stored in the data layer, which allows to recover the stored data. When the thickness of the substrate of the recording medium is constant over the whole recording medium, the light reflected from the recording medium has a nearly flat phase profile. If, however, there are deviations in the thickness of the substrate, this wavefront assumes a donut shaped profile with spatially varying phase gradients. The phase distribution of such a wavefront is depicted in FIG. 1. The direction of propagation, i.e. the angle of the optical rays, is perpendicular to the local phase gradient, as indicated by the arrows. The arrows are not to scale. By measuring the direction of the light coming from a selected region of the beam, i.e. the direction of one of the arrows, information about the amount of spherical aberration is obtained.

Figure 2:
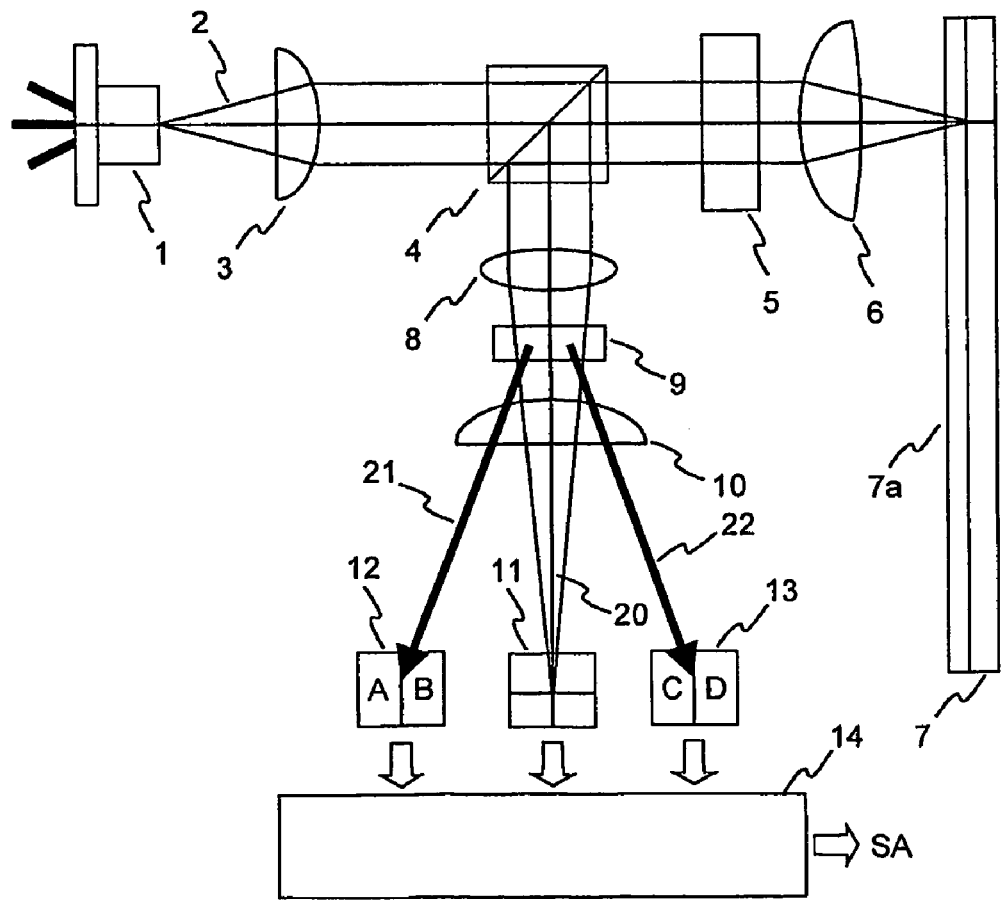
FIG. 2 shows an optical pickup capable of measuring spherical aberration.

FIG. 2 schematically depicts an optical pickup for a multi-layer optical recording medium capable of measuring spherical aberration. The pickup largely corresponds to a standard pickup. However, additional elements are provided for measuring the spherical aberration. A laser diode 1 emits a linearly polarized light beam 2 along an optical axis. The light beam 2 is collimated by a collimator 3 and passes a polarizing beam splitter 4 and a quarter-wave plate 5, which transforms the linear polarization of the light beam 2 into a circular polarization. The light beam 2 is then focused onto a recording medium 7 having a cover layer 7a by a focusing lens 6. A part of the light beam 2 is reflected from the recording medium 7 and collimated by the focusing lens 6. As the reflected light beam 2 passes the quarter-wave plate 5, its circular polarization is transformed to a linear polarization. However, the direction of polarization of the reflected light beam 2 after passing the quarter-wave plate 5 is perpendicular to the direction of polarization of the initial light beam 2. Therefore, the reflected light beam 2 is now reflected by the polarizing beam splitter 4 towards a detector arrangement 11, 12, 13. A further focusing lens 8 focuses the light beam 2 through a cylindrical lens 10 onto a four-quadrant detector 11 for standard tracking and focusing control. However, a special beam splitter 9 splits the light beam 2 returning from the recording medium into three beams 20, 21, 22. The main beam 20, which carries about 90% of the energy, is focused onto the four-quadrant detector 11. The two remaining beams 21, 22 are focused on position sensitive two-quadrant detectors 12, 13. The first two-quadrant detector 12 generates the signals A and B, the second two-quadrant detector 13 the signals C and D. By calculating a normalized difference signal SA a signal processor 14 determines the propagation direction of the beams. The normalized difference signal SA is calculated according to the following formula:

$$SA=0.5*([(A-B)/(A+B)]+[(D-C)/(D+C)]).$$

In principle this measurement method corresponds to a very simple Shack-Hartmann wavefront sensor. Due to the design of the beam splitter 9 and the positioning of the detectors 12, 13 the normalized difference signal SA is equal to zero for a collimated wave without spherical aberration. When spherical aberration is present, the spots on the two-quadrant detectors 12, 13 move and the absolute value of the normalized difference signal SA is larger than zero. As the sign of normalized difference signal SA depends on the sign of the spherical aberration, the normalized difference signal SA can be used as a control signal for a spherical aberration corrector (not shown).

Figure 3:
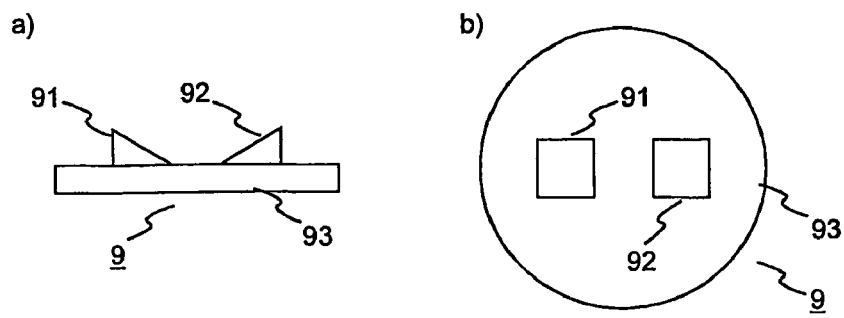
FIG. 3 depicts in more detail a special beam splitter.

The special beam splitter 9 is shown in FIG. 3 in more detail, whereby part a) of the figure shows a side view, while part b) shows a top view of the beam splitter 9. The beam splitter mainly consists of two small prisms 91, 92, which are fixed on a flat glass substrate 93. Preferably, the prisms 91, 92 are arranged symmetrically to the optical axis of the light beam 2. Light falling within the regions of the prisms 91, 92 is deviated by a fixed angle. The remaining light is transmitted straight through the beam splitting element 9.

Figure 4:
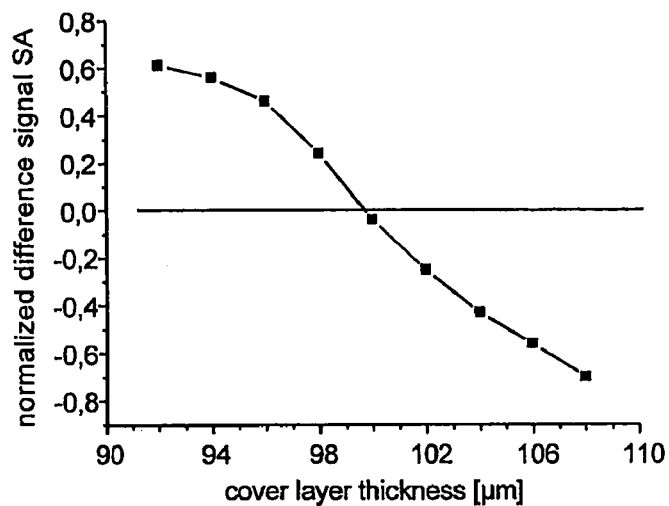
FIG. 4 shows the normalized difference signal SA as a function of the thickness of the cover layer.

A simulation of the normalized difference signal SA as a function of the thickness of the cover layer of the recording medium, which was obtained with the help of a ray tracing program, is shown in FIG. 4. For the simulation a focusing lens 6 having a numerical aperture of 0.85 and being corrected for a cover layer thickness of 100 μm was assumed. Before calculating the normalized difference signal SA the astigmatic focus control signal was set equal to zero by adapting the position of a focus actuator, i.e. the distance of the focusing lens 6 from the recording medium. The simulation shows that the sign of the normalized difference signal SA depends on the sign of the cover layer thickness deviation, and that the signal is suitable for controlling a spherical aberration correcting element.

Figure 5:
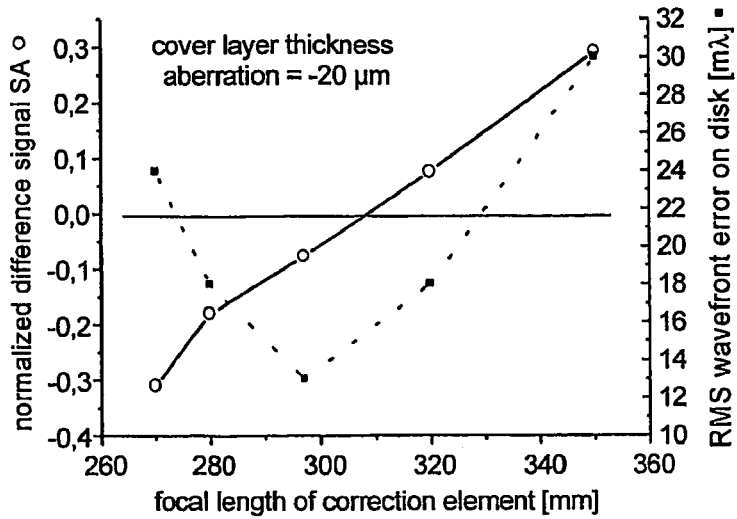
FIG. 5 depicts the normalized difference signal SA as a function of the focal length of a liquid-crystal lens used for aberration correction.

In FIG. 5 the normalized difference signal SA (left axis, solid line) is depicted as a function of the focal length of a liquid-crystal lens, which is used for correcting the spherical aberration. The figure further shows the wavefront error in the focal spot on the recording medium (right axis, dotted line). The small offset of the normalized difference signal SA at the position of minimum wavefront error (at 298 mm) can be corrected electronically.

Figure 6:
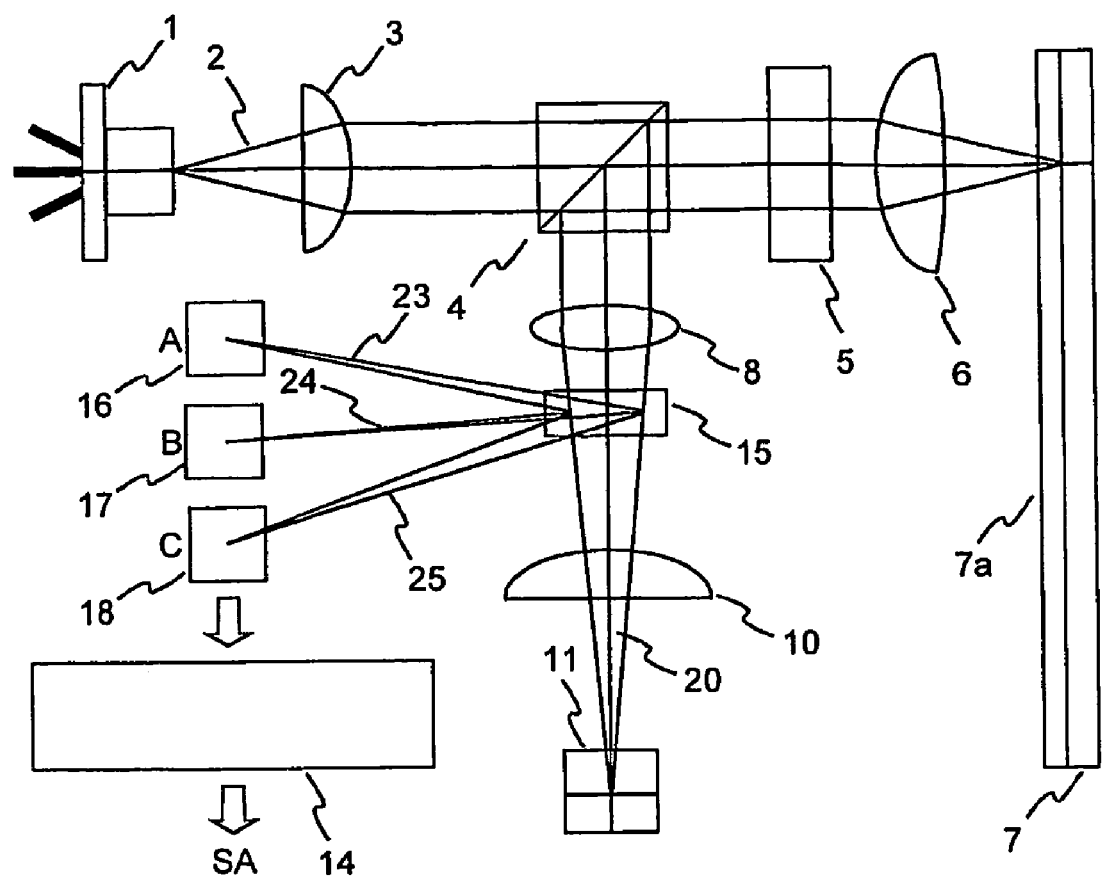
FIG. 6 depicts an optical pickup according to the invention capable of measuring spherical aberration.

An approach according to the invention for measuring the spherical aberration is shown in FIG. 6. In this embodiment the special beam splitter is replaced by a special volume hologram 15. Furthermore, instead of two additional detectors three additional detectors 16, 17, 18 are used, generating the signals A, B and C, respectively. It is well known that volume holograms can be used to correlate wavefronts with stored patterns. By storing wavefront patterns with various degrees of spherical aberration, it is possible to determine the amount of spherical aberration of an impinging wavefront. The hologram is preferably designed as follows. Most of the light (≦90%) is transmitted through the hologram. If the wavefront passing through the hologram 15 has a positive spherical aberration, 1-2% of the light are focused on the first detector 16. If the wavefront passing through the hologram 15 has no spherical aberration, 1-2% of the light are focused on the second detector 17. If the wavefront passing through the hologram 15 has a negative spherical aberration, 1-2% of the light are focused on the third detector 18. By comparing the signals A, B, C of the three detectors 16, 17, 18 with a suitable algorithm a control signal for a spherical aberration corrector is generated. Favourably, the hologram 15 is located directly on the focusing lens 6. This has the advantage that the hologram 15 always remains well adjusted even if the focusing lens 6 is actuated for focusing or tracking. The main difficulty for this technique is the initial design of the hologram 15.

Once the design is done the volume hologram 15 can easily be mass produced by replication in plastic.

The invention claimed is:

1. Method for determining spherical aberration in a light beam, including the steps of:
    splitting the light beam into at least two partial light beams;
    focusing the partial light beams onto respective detectors, whereby at least one signal generated by the detectors depends on the positions of the respective partial light beam; and
    determining the spherical aberration using the signals generated by the detectors;
wherein a volume hologram having stored wavefront patterns with various degrees of spherical aberration is provided for splitting the light beam into the partial light beams.

2. Method according to claim 1, wherein the partial beams are focused onto the respective detectors in dependence on the amount of spherical aberration in the light beam.

3. Device for determining spherical aberration in a light beam, including:
    a volume hologram having stored wavefront patterns with various degrees of spherical aberration for splitting the light beam into at least two partial light beams;
    focusing means for focusing the partial light beams onto respective detectors; and
    a signal processor for determining the spherical aberration using the signals generated by the detectors.

4. Device according to claim 3, wherein the partial beams are focused onto the respective detectors in dependence on the amount of spherical aberration in the light beam.

* * * * *

UNITED STATES PATENT AND TRADEMARK OFFICE
CERTIFICATE OF CORRECTION

PATENT NO.       : 7,633,613 B2  
APPLICATION NO.  : 10/585536  
DATED            : December 15, 2009  
INVENTOR(S)      : Joachim Knittel Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Ninth Day of November, 2010

David J. Kappos  
*Director of the United States Patent and Trademark Office*